United States Patent Office 3,040,087
Patented June 19, 1962

3,040,087
HOMOPOLYMER OF GLYCOLLIC ACID
Norman J. Bowman, Philadelphia, Pa., and Wayne A. Proell, Chicago, Ill., assignors to Standard Oil Company, Chicago, Ill., a corporation of Indiana
No Drawing. Original application Sept. 30, 1957, Ser. No. 687,851. Divided and this application Mar. 24, 1959, Ser. No. 801,664
8 Claims. (Cl. 260—481)

This is a division of our co-pending Serial No. 687,851, filed September 30, 1957, now Patent No. 2,999,033.

This invention relates to a plasticizer for polymers.

In the field of solid propellants based on ammonium nitrate as the oxidizer binders are used to permit the formation of shaped grains. For reasons of economy of manufacture, it is desirable that the grain have qualities which permit formation by extrusion. In order to attain this end polymeric materials are combined with plasticizers to produce thermoplastic compositions which can be combined with the ammonium nitrate to form plastic masses at temperatures of about 100° C. Not only must the plasticizers used for this purpose be excellent materials for softening polymers such as cellulose esters and polyvinyl chloride but also the plasticizers must not upset the oxygen balance of the propellant.

An object of the invention is a plasticizer suitable for use with organic polymeric materials. A particular object is a thermoplastic composition of an organic polymer and plasticizers suitable for manufacture of ammonium nitrate type solid propellants. Other objects will be apparent in the course of the detailed description.

The plasticizer of this invention is a polymeric substance consisting of the homopolymer of glycolic acid where the polymerization has been carried out in the presence of a chain terminator namely an aliphatic alcohol containing from 1 to 6 carbon atoms with the alcohol being present in an amount between about 3 and 25 mol percent based on glycolic acid charged. The glycolic acid may be either glycolic acid (hydroxy acetic acid) or thioglycolic acid. The acid may be used in the absence of solvents or may be charged to the polymerization zone in a solution. The 70 percent aqueous glycolic acid solution is particularly suitable.

The chain terminator, which is present in order to obtain a material of the desired characteristics, is an aliphatic alcohol containing from 1 to 6 carbon atoms. The alcohol may be monohydric such as, methanol, propanol, allyl alcohol or hexanol. The alcohol may be dihydric such as, ethylene glycol, propylene glycol, diethylene glycol, or dipropylene glycol. A trihydric alcohol such as, glycerin may also be used. In addition to the alcohols containing only carbon, hydrogen and oxygen other substituents may be present. The presence of nitro groups is helpful in improving the stoichiometry of the polymeric substances of the invention.

The polymeric substance is produced essentially in the manner well known for carrying out of homopolymerization of materials of this particular type. In general when using glycolic acid as such the acid and the alcohol are introduced into the polymerization zone, which is provided with a reflux condenser and the zone is heated to about 150° C. at atmospheric pressure. At this temperature the polymerization proceeds with the production of water, which water is taken overhead, usually with some alcohol, in order to drive the reaction to completion. When the rate of water evolution decreases vacuum is applied to the system in order to carry the polymerization to completion as determined by the amount of alcohol present. Increasing the temperature increases the rate of polymerization and temperatures as high as 200° C. or even higher may be used. The type of alcohol used as chain terminator will have some bearing on the operating conditions used in the process. Higher boiling alcohol generally will permit higher temperatures to be used. When aqueous glycolic acid is charged to the reactor the solvent water may be distilled off before the addition of the alcohol to the reactor or the alcohol and the aqueous acid may be charged simultaneously. The completion of the reaction is indicated by the essentially complete cessation of water vapor production from the reaction zone. When using lower boiling alcohols it may be necessary to add alcohol to the reaction zone during the polymerization in order to replace that lost along with the water vapor produced.

The polymeric substance is a suitable plasticizer for these organic polymers: The cellulose esters of acetic acid, propanoic acid and butyric acid, including the mixed esters; examples of these are cellulose acetate, cellulose butyrate, and cellulose acetate propionate. The polyvinyl polymers namely, polyvinyl butyral, polyvinyl chloride, and polyvinyl acetate. Polyacrylonitrile is a suitable polymer. Polystyrene is a suitable polymer. The co-polymers of styrene and acrylonitrile is also plasticizable. For the purposes of this disclosure petroleum asphalt is defined as an organic polymer. In addition to the asphalts which are naturally occurring or obtainable by distillation from crude oil or propane precipitation from crude oil, asphalts which have been obtained by oxidation of petroleum materials are plasticizable. An example of a particularly suitable asphalt is a roofing grade material obtained by air-blowing a petroleum residuum; this asphalt has a softening point falling within the range of 215°–235° F., a Cleveland open cup flash point above 550° F. and an ASTM penetration of more than 0.8 mm. at 32° F. and not more than 4.00 mm. at 115° F.

The thermoplastic composition comprising the polymeric substance and polymer generally contains between about 18 and 40 weight percent of the polymer.

Although for many uses a simple thermoplastic composition consisting only of one of the polymers and one of the defined substances is suitable, when the most rigid military specifications are to be met with ammonium nitrate solid propellants it is generally desirable to have present in the binder an adjunct plasticizer. It is to be understood that the thermoplastic composition used as a binder may contain in addition to the polymer the defined substance and an adjunct plasticizer various amounts of other additives which serve certain purposes in the manufacture of the propellant grain or in improving operational characteristics of the propellant grain. In general, a thermoplastic composition containing adjunct plasticizer will still contain between about 18 and 40 percent of the defined polymer.

The adjunct plasticizers are in general oxygen containing organic materials. Broadly any of the known plasticizers for one or more of the defined polymers may be used to some extent in combination with the polymer and the defined polymeric substance. The requirements of a particular binder may eliminate from use one or more of the commonly known plasticizers. In addition to oxygen many of the better adjunct plasticizers contain nitro groups. Examples of several broad classes of materials suitable for use as adjunct plasticizers are set out hereinafter along with illustrative compounds from each of these broad classes. It is to be understood that the list set out hereinafter is not limiting and is intended to be merely a guidepost for the workers in this art. Suitable adjunct plasticizers are:

(A) Di-lower alkyl-phthalates, e.g., dimethyl phthalate, dibutyl phthalate, dioctyl phthalate and dimethyl nitrophthalate.

(B) Nitrobenzenes, e.g., nitrobenzene, dinitrobenzene, nitrotoluene, dinitrotoluene, nitroxylene, and nitrodiphenyl.

(C) Nitrodiphenyl ethers, e.g., nitrodiphenyl ether and 2,4-dinitrodiphenyl ether.

(D) Tri-lower alkyl-citrates, e.g., triethyl citrate, tributyl citrate and triamyl citrate.

(E) Acyl tri-lower alkyl-citrates where the acyl group contains 2–4 carbon atoms, e.g., acetyl triethyl citrate and acetyl tributyl citrate.

(F) Glycerol-lower alkanoates, e.g., monoacetin, triacetin, glycerol tripropionate and glycerol tributyrate.

(G) Lower alkylene-glycol-lower alkanoates wherein the glycol portion has a molecular weight below about 200, e.g., ethylene glycol diacetate, triethylene glycol dihexoate, triethylene glycol dioctoate, polyethylene glycol dioctoate, dipropylene glycol diacetate, nitromethyl propanediol diacetate, hydroxyethyl acetate and hydroxy propyl acetate (propylene glycol monoacetate).

(H) Dinitrophenyl-lower alkyl-lower alkanoates, e.g., dinitrophenyl ethylacetate, and dinitrophenyl amyloctoate.

(I) Lower alkylene-glycols wherein the molecular weight is below about 200, e.g., diethylene glycol, polyethylene glycol (200), and tetrapropylene glycol.

(J) Lower alkylene-glycol oxalates, e.g., diethylene glycol oxalate and polyethylene glycol (200) oxalate.

(K) Lower alkylene-glycol maleates, e.g., ethylene glycol maleate and bis-(diethylene glycol monoethyl ether) maleate.

(L) Lower alkylene-glycol diglycolates, e.g., ethylene glycol diglycolate and diethylene glycol diglycolate.

(M) Miscellaneous diglycollates, e.g., dibutyl diglycollate, dimethyl alkyl diglycollate and methylcarbitol diglycollate.

(N) Lower alkyl-phthalyl-lower alkyl-glycollate, e.g., methyl phthalyl ethyl glycollate, ethyl phthalyl ethyl glycollate and butyl phthalyl butyl glycollate.

(O) Di-lower alkyloxy-tetraglycol, e.g., dimethoxy tetraglycol and dibutoxy tetraglycol.

(P) Nitrophenyl ether of lower alkylenes glycols, e.g., dinitrophenyl ether of triethylene glycol and nitrophenyl ether of polypropylene glycol.

EXAMPLE I

*Glycolic Acid and Ethylene Glycol*

The various polymeric substances produced in this example were prepared in the same manner except for the amount of ethylene glycol present in the reaction zone. In all instances glycolic acid in the form of a 70 percent aqueous solution was introduced into the flask provided with a reflux condenser and a trap-out. The desired amount of ethylene glycol was added to the flask containing the aqueous glycolic acid solution. The flask was heated to 150° C. at atmospheric pressure. Water was continuously removed from the system through the trap-out. After the water production rate had decreased a vacuum was applied to the system and heat was continued at 150° C. at 20 mm. of Hg pressure. When the water production rate had essentially reached zero the polymerization was considered to be completed and the reaction product was removed from the flask.

TYPE 1

Type 1 polymeric substance was produced by reacting 1 mol of glycolic acid in the presence of 0.03 mol of ethylene glycol. The yield of polymeric substance was about 85% of the theoretical. The product was a solid having a melting point of about 100° C.

A thermoplastic composition suitable for use with ammonium nitrate to form shaped propellants was produced which consisted of Type 1 polymeric substance 30 weight percent, triethyl citrate 30 weight percent, asphalt 10 weight percent and cellulose acetate butyrate 30 weight percent. This binder was a tough rubbery material which formed a rather fluid liquid at about 130° C.

TYPE 2

Type 2 substance was prepared using 0.05 mol of ethylene glycol per mol of glycolic acid. Type 2 product is a very viscous liquid at ambient temperature.

Thermoplastic compositions suitable for propellant use were made. A composition of equal parts by weight of Type 2 substance, 2,4-dinitrodiphenyl ether and cellulose acetate had a melting point of 120° C. and was a good rubbery material. Another suitable thermoplastic composition consisted of Type 2 substance 30 wt. percent, triethyl citrate 30 wt. percent, asphalt 10 wt. percent and cellulose acetate 30 wt. percent.

TYPE 3

Type 3 substance was produced using 0.10 mol of ethylene glycol per mol of glycolic acid charged. Type 3 material is a viscous liquid at ambient temperature.

Several thermoplastic compositions suitable for use as binders were prepared from this Type 3 polymer. Examples of these are:

A composition consisting of 62 wt. percent of Type 3 substance and 38 wt. percent of cellulose acetate had a melting point of 118° C. and had good rubbery characteristics.

A composition consisting of Type 3 substance 30 wt. percent, dinitrodiphenyl ether 30 wt. percent, and cellulose acetate 40 wt. percent had a melting point of 118° C. and good rubbery characteristics.

A good rubbery composition was produced containing 83 wt. percent of Type 3 polymeric substance and 17 wt. percent of polyvinyl acetate.

Another composition contained 15 wt. percent of Type 3 material, 20 wt. percent of triethyl citrate, 30 wt. percent of dinitrophenyl triglycol ether, 5 wt. percent of asphalt and 30 wt. percent of styrene-acrylonitrile.

Another composition contained 30 wt. percent of Type 3 substance, 25 wt. percent of triethyl citrate, 10 wt. percent of asphalt and 35 wt. percent of cellulose acetate butyrate.

Ammonium nitrate containing propellant grains which were suitable for use in jato units were prepared using various thermoplastic compositions. In general the binder was prepared by mixing the polymeric substance, the adjunct plasticizer and the polymer to form a fluid material at about 130° C. This mass was cooled to about 100° C. and ammonium nitrate combustion catalyst and other components as needed were then mixed into the binder to form a plastic mass which could be extruded or cast into the desired shape. Two propellant compositions suitable for jato use are set out below.

Ammonium nitrate 73 wt. percent, combustion catalyst 2 wt. percent, dinitrodiphenyl ether 8.7 wt. percent, cellulose acetate, 7.5 wt. percent and Type 3 polymeric substance 8.8 wt. percent.

Ammonium nitrate 69 wt. percent, catalyst and carbon and additives 9 wt. percent, styrene-acrylonitrile 6.6 wt. percent, asphalt 1.1 wt. percent, triethyl citrate 4.4 wt. percent, di(dinitrophenyl) triglycol ether 6.6 wt. percent, and Type 3 polymeric substance 3.3 wt. percent.

TYPE 4

Type 4 polymeric substance was produced using 0.20 mol of ethylene glycol per mol of glycolic acid charged. Type 4 product is a viscous liquid which is more fluid than either Type 2 or Type 3 product. Good rubbery thermoplastic compositions were made having a melting point on the order of 100° C. with several polymers. Illustrative thermoplastic compositions are set out below.

Polyvinyl acetate 25 wt. percent, and Type 4 material 75 wt. percent. Cellulose acetate 25 wt. percent and Type 4 material 75 wt. percent. Cellulose acetate butyrate 30 wt. percent, triethyl citrate 10 wt. percent and Type 4 material 60 wt. percent. Cellulose acetate 40 wt. percent, dinitrodiphenyl ether 30 wt. percent and Type 4 polymeric material 30 wt. percent.

EXAMPLE II

In this example one mol of glycolic acid in the form of 70% aqueous solution and 0.2 mol of n-butanol were charged to the polymerization zone. Water and n-butanol evaporated in the form of an azeotrope. Butanol condensate was separated from water condensate and returned to the reaction zone along with sufficient make-up so that the total n-butanol consumed was on the order of 20 mol percent. The polymerization was carried to completion at 150° C. at a pressure of 20 mm. Hg. The product was a viscous liquid at room temperature.

A thermoplastic binder material having a melting point of about 110° C. and an excellent strength and rubbery characteristics was prepared by blending equal weights of cellulose acetate, dinitrodiphenyl ether and the polymeric substance of this example. A shaped ammonium nitrate propellant grain was prepared by using 24 wt. percent of the thermoplastic composition along with 2 wt. percent of combustion catalyst and 74 wt. percent of ammonium nitrate.

EXAMPLE III

In this example glycolic acid and nitromethyl propanediol were charged to the polymerization zone at a mol ratio of 0.2 mol of diol per mol of glycolic acid. The polymer product was a viscous liquid at room temperature.

A thermosplastic composition consisting of cellulose acetate 40 wt. percent and 60 wt. percent of this polymeric substance had a melting point of 80° C. Another thermoplastic composition consisting of cellulose acetate 40 wt. percent, dinitrodiphenyl ether 30 wt. percent and 30 wt. percent of this polymeric substance had a melting point of 115° C. and was a tough rubbery material at room temperature.

EXAMPLE IV

One mol of thioglycolic acid, 0.1 mol of ethylene glycol were added in the polymerization zone at 120° C. to remove water of solution primarily. The reaction zone was then brought to about 10 mm. of Hg pressure and heated at 140° C. until the reaction was essentially complete. The reaction product was distilled to obtain a lower boiling material boiling between about 120 and 140° C. at 10 mm. of Hg and a residuum which was a viscous liquid at room temperatures.

Comparison of the characteristics of the residuum product indicates it to be essentially equal to Type 2 material of Example 1.

A thermoplastic composition consisting of cellulose acetate 37 wt. percent and 63 wt. percent of the lower boiling product had a melting point of 110° C. A thermoplastic composition consisting of asphalt 5 wt. percent, polyvinyl acetate 20 wt. percent and 75 wt. percent of the lower boiling product of this example was a rubbery material at room temperature.

Thus having described the invention, what is claimed is:

1. A polymeric substance consisting of the product of the polymerization of an acid selected from the group consisting of glycolic acid and thioglycolic acid in the presence of between about 3 and 25 mol percent of an alcohol containing from 1 to 6 carbon atoms and selected from the group consisting of alkanols, alkanediols, alkanetriols and said alcohols containing nitro group substituents, by heating said acid and said alcohol to a temperature between about 150° C. and 200° C. under conditions affording polymerization and removing water formed in said polymerization.

2. The substance of claim 1 where said acid is glycolic acid.

3. The substance of claim 1 where said acid is thioglycolic acid.

4. The substance of claim 1 where said alcohol is ethylene glycol.

5. The substance of claim 1 where said alcohol is butanol.

6. The substance of claim 1 where said alcohol is nitromethyl propandiol.

7. The substance of claim 1 where said alcohol is ethylene glycol and said amount is between 10 and 25 mol percent.

8. A polymeric substance prepared by heating glycolic acid, and between about 10 and 25 mol percent of an alcohol containing between 1 and 6 carbon atoms and selected from the group consisting of alkanols, alkanediols, alkanetriols and said alcohols containing nitro group substituents, to a temperature between about 150° C. and 200° C. under conditions affording homopolymerization of said acid and removing water formed in said polymerization.

No references cited.